United States Patent [19]
Hsieh et al.

[11] Patent Number: 5,559,675
[45] Date of Patent: Sep. 24, 1996

[54] COMPUTER CPU HEAT DISSIPATING AND PROTECTING DEVICE

[75] Inventors: Chih-Ho Hsieh, Taipei; Ing-Jen Lee, Hsin Tien, both of Taiwan

[73] Assignee: Twinhead International Corp., Taiwan

[21] Appl. No.: 411,545

[22] Filed: Mar. 28, 1995

[51] Int. Cl.⁶ .................................................. H05K 7/20
[52] U.S. Cl. ..................... 361/707; 174/16.3; 257/718; 361/687; 361/715; 361/720
[58] Field of Search ................... 165/80.2, 80.3, 165/185; 174/16.3; 257/718, 719, 726, 727, 706–707, 711, 712; 361/687–688, 690, 704, 707, 709–722; 364/708.1

[56] References Cited

U.S. PATENT DOCUMENTS

| | | | |
|---|---|---|---|
| 5,280,409 | 1/1994 | Selna | 257/718 |
| 5,353,192 | 10/1994 | Nordin | 361/690 |
| 5,379,185 | 1/1995 | Griffin et al. | 361/715 |

OTHER PUBLICATIONS

IBM Technical Disclosure Bulletin, "CPU Cooling System for Notebook PC", vol. 37, No. 11, Nov. 1994, p. 15.

*Primary Examiner*—Gregory D. Thompson
*Attorney, Agent, or Firm*—Brumbaugh, Graves, Donohue & Raymond

[57] ABSTRACT

A heat dissipating and protecting device for computer central processing unit (CPU) mounted on a printed circuit board (PCB) includes a first conduction member directly disposed on the CPU and a second conduction member disposed on the PCB to be in heat conduction connection with the CPU via through holes formed on the PCB between the second conduction member and the CPU with conductive plugs inserted therein to form a heat conduction path between the CPU and the second conduction member. A first convection member having fins formed thereon is heat-conductively secured to the conduction members to remove heat from the conduction member. A second convection member in contact engagement with the conduction members has a large surface area for performing heat convection. An elongated bar made of a compliant, high heat conductivity material has a first end press-fit into a slot formed on the second convection member to releasably secure to the latter. The conduction members have at least one groove formed thereon to allow a second end of the bar to press-fit therein to establish a heat conduction contact engagement between the second convection member and the conduction members. There may be more than one such grooves directed in different orientations, which, in combination with the compliance of the bar, allows the second convection member to be accommodated within a notebook computer.

9 Claims, 3 Drawing Sheets

COMPUTER CPU HEAT DISSIPATING AND PROTECTING DEVICE

FIELD OF THE INVENTION

The present invention relates to a computer CPU (central processing unit) heat dissipating and protecting device, particularly for use with a TCP packing CPU of notebook computers.

BACKGROUND OF THE INVENTION

Heat dissipating devices for computer CPUs are known to those having ordinary skill in personal computer field. Most of the CPU heating dissipating devices are in the form of heat sink, namely a block or plate made of high heat conductivity material, such as aluminum or aluminum alloy, with fins formed thereon to be attached to and thus in heat transfer contact engagement with a top surface of the CPU. Heat generated during the operation of the CPU is then conducted to the heat sink and then removed by convection to environment. An disadvantage of heat sink of this type is its low heat removal rate.

To increase heat removal rate, it has been proposed to add a fan to the heat sink to cause force convection through the fins of the heat sink. This does increase the heat removal rate of the computer CPU. A problem associated with the use of fan is the space that the fan has to take. This is particularly serious for minimized personal computers, such as notebook computers, because the notebook computers have a very limited interior space to accommodate such a fan. Further, the operation of the fan consumes electrical energy and this is also a big problem in notebook computers for the notebook computers are usually powered by battery sets which usually have only a limited power supply.

To overcome such problems, it is therefore desirable to provide a device for removing heat generated during the operation of a computer CPU, particularly a notebook computer or a palm top computer, and meanwhile to provide a protection to the CPU of the notebook computer which is in general a TCP packing CPU rather than PGA (pin grid array) packing CPU used in regular size personal computers.

SUMMARY OF THE INVENTION

It is an object of the present invention to provide a CPU heat dissipating device which has a high heat removal rate as compared to the conventional non-force convection type heat sink, but requiring no convection fan used in the conventional force convection type heat sink.

It is another object of the present invention to provide a CPU heat dissipating device which is capable to be easily accommodated within a limited interior space of a minimized personal computer, such as a notebook computer.

It is a further object of the present invention to provide a CPU heat dissipating and protecting device which comprises relatively rigid conductive members disposed on both sides of the CPU for more efficiently removing heat from the CPU and protecting the CPU also.

To achieve the above objects, there is provided a heat dissipating and protecting device for computer CPU mounted on a printed circuit board (PCB) comprising a first conduction member directly disposed on the CPU and a second conduction member disposed on the PCB to be in heat conduction connection with the CPU via through holes formed on the PCB between the second conduction member and the CPU with conductive plugs inserted therein to form a heat conduction path between the CPU and the second conduction member. A first convection member having fins formed thereon is heat-conductively secured to the conduction members to remove heat from the conduction member. A second convection member in contact engagement with the conduction members has a large surface area for performing heat convection. An elongated bar made of a compliant, high heat conductivity material has a first end press-fit into a slot formed on the second convection member to releasably secure to the latter. The conduction members have at least one securing groove formed thereon to allow a second end of the bar to press-fit therein to establish a heat conduction contact engagement between the second convection member and the conduction members. There may be more than one securing grooves directed in different orientations, which, in combination with the compliance of the bar, allows the second convection member to be accommodated within a limited space inside a notebook computer.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENTS

Figure 1:
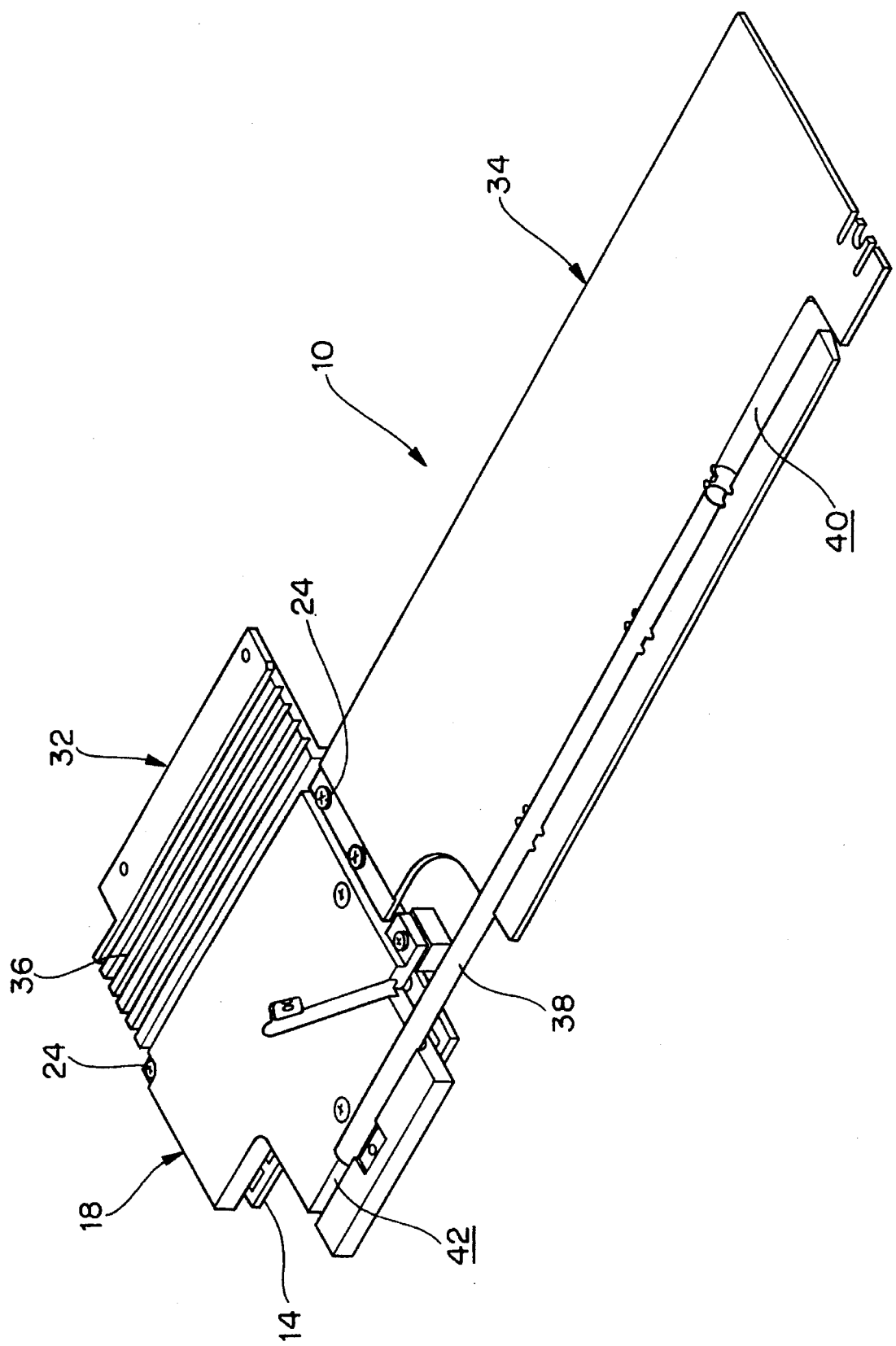
FIG. 1 is a perspective view showing a heat dissipating and protecting device constructed in accordance with the present invention for use with a TCP packing CPU of a notebook computer.
Figure 2:
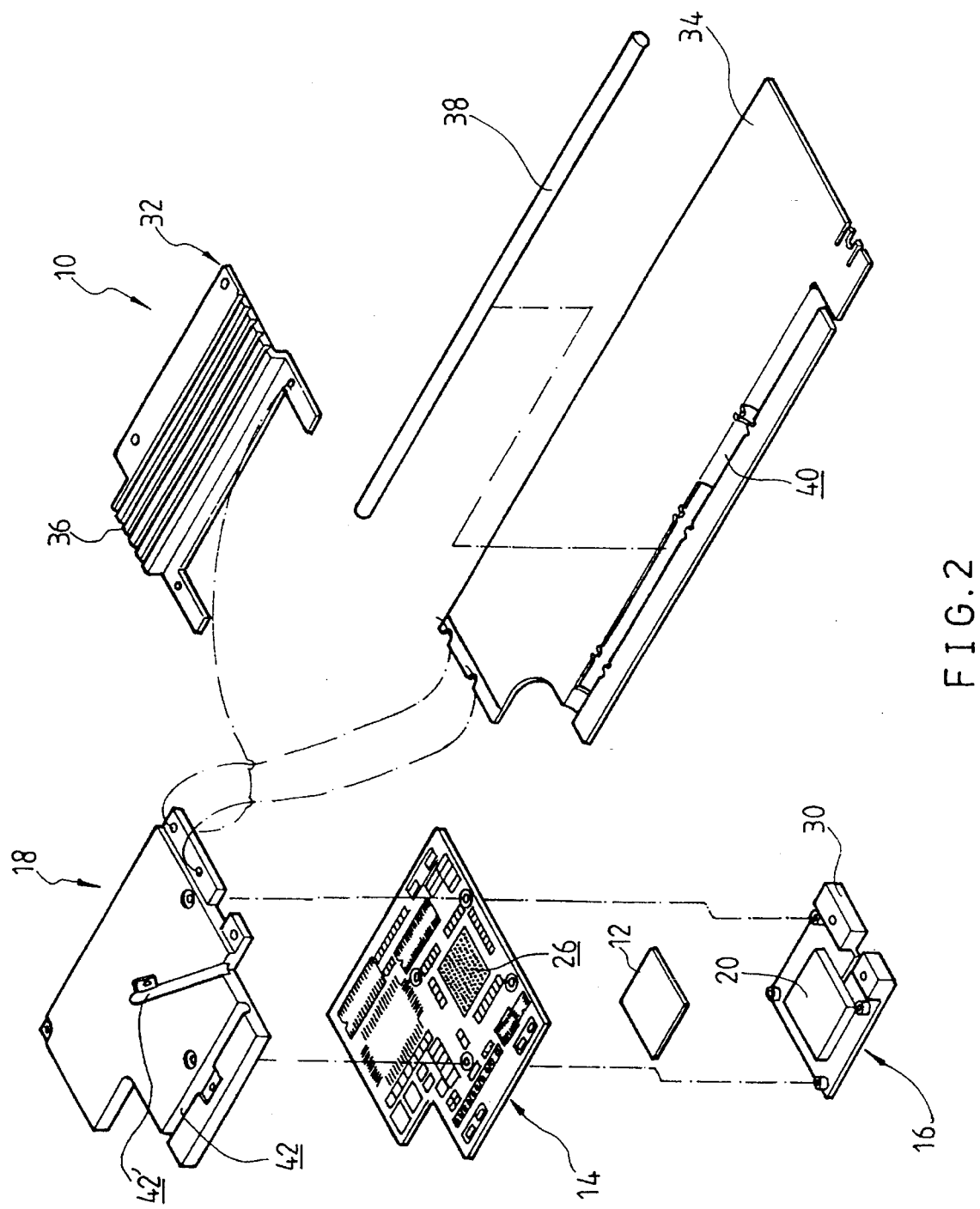
FIG. 2 is an exploded perspective view showing the CPU heat dissipating and protecting device constructed in accordance with the present invention with a printed circuit board having a TCP packing CPU mounted a PCB shown to be sandwiched between two conduction members of the heat dissipating and protecting device.

With reference to the drawings and in particular to FIGS. 1 and 2, wherein a heat dissipating and protecting device, generally designated with the reference numeral 10, is shown to be disposed around a central processing unit (CPU) 12 which has a bottom surface mounted on a first surface of a printed circuit board (PCB) 14 by means of any known technique, such as surface mounting techniques. The PCB 14 has a second surface, opposite to the first surface thereof having the CPU 12 mounted thereto, to have other electronic elements or devices, such as memory secured thereto.

The heat dissipating and protecting device 10 of the present invention comprises a first heat conduction member 16 and a second heat conduction members 18 of which the first heat conduction member 16 is directly disposed on a top surface of the CPU 12 to be in heat conductive contact engagement with the CPU 12. To help achieving such a heat conductive contact engagement, the first conduction member 16 may be provided with a raised portion 20 having a area substantially corresponding to that of the CPU 12 to be in directly disposed on the CPU 12. The first heat conduction member 16 may have a overall surface area sufficient to cover the CPU 12, but is smaller than the surface area of the PCB 14.

Figure 3:
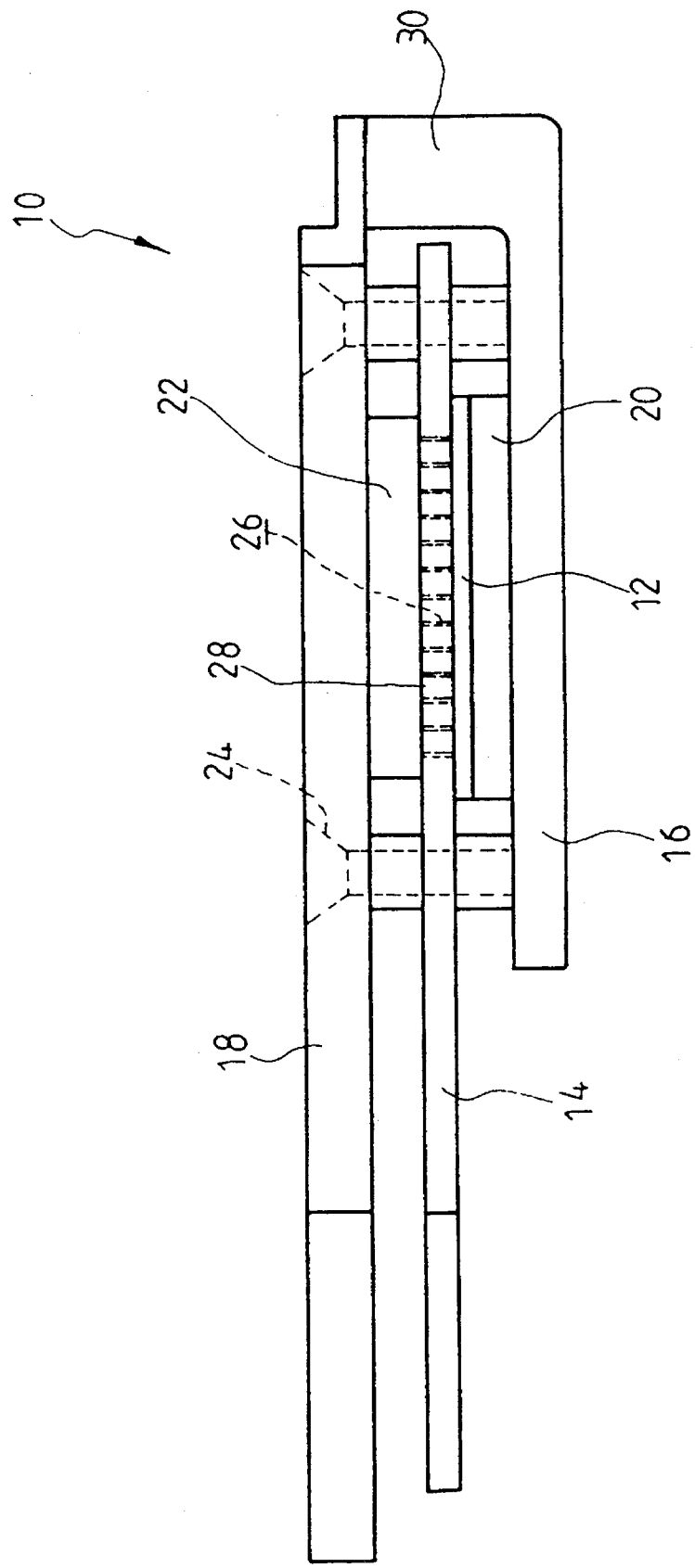
FIG. 3 is an elevation showing the spatial relationship between the heat dissipating and protecting device of the present invention and the PCB.

The second heat conduction member 18 has an overall surface area substantially corresponding to the PCB 14 to be matchingly disposed on the second surface of the PCB 14 to cover the PCB 14 for protection and heat removing purpose. Corresponding to the raised portion 20 of the first conduction member 16 or the CPU 12, a raised portion 22 is formed on the second heat conduction member 18 (see FIG. 3) to be in direct contact engagement with the portion of the second surface of the PCB 14 that is exactly opposite to the CPU 12 mounted on the first surface of the PCB 14. The first and second heat conduction members 16 and 18 are secured together to sandwich the CPU 12, as well as the PCB 14, therebetween by means of fasteners, such as screws 24 shown in FIG. 1 and at dashed lines in FIG. 3.

Since the PCB 14 is usually made of a material that has low heat conductivity, to increase heat transfer from the CPU 12 to the second heat conduction member 18, a plurality of through holes 26 (FIGS. 2 and 3) are provided on the PCB 14 on the area to which the CPU 12 is mounted to be located between the second conduction member 18 and the CPU 12. Inside each of the through holes 26, a heat conductive plug member 28 is inserted to be in contact engagement with both the CPU 12 and the second conduction member 18 so as to establish a heat conduction path between the CPU 12 and the second heat conductive member 18. With such an arrangement, heat generated during the operation of the CPU 12 is dissipated through both the first heat conduction member 16 which is in direct contact engagement with the CPU 12 and the second heat conduction member 18 which is in indirect contact engagement with the CPU 12 via the conductive plug members 28.

It is quite apparent that sandwiching the CPU 12 between the first and second heat conduction members 16 and 18 allows the CPU 12 to be protected by the heat conduction members 16 and 18 which are made of a material much stronger and tougher than that of the CPU 12.

Preferably a heat conduction path 30 is defined between the first and second heat conduction members 16 and 18 to allow heat to be removed in a more efficient manner. Such a heat conduction path 30 may be formed by having an extension formed on one of the first and second heat conduction members 16 and 18, which in the embodiment illustrated is the first heat conduction member 16, to extend toward and thus physically contact the second heat conduction member 18, see FIG. 3.

The heat transferred from the CPU 12 to the heat conduction members 16 and 18 is further transferred into environment via a first heat convection member 32 and/or a second heat convection member 34. The first heat convection member 32 is made in the form of a conventional heat sink, namely having a plurality of fins 36 formed thereon to provide a better heat convention between the first heat convection member 32 and the environment. In the embodiment illustrated, the first heat convection member 32 is shown fixed to one lateral side of the first and second heat conduction members 16 and 18 by means of the screws 24 that secures the first and second heat conduction members 16 and 18 together and laterally extending therefrom.

The second heat convection member 34 comprises a large piece of thin conductive material in physical contact with the first and second heat conduction members 16 and 18 at a second lateral side thereof. The large surface area of the second heat convection member 34 provides a high heat convection efficiency.

The second heat convection member 34 may be screw-secured to the first heat conduction member 16, as shown in the drawings, or the second heat conduction member 18. However, since the interior space inside a notebook computer (not shown) is quite limited, to allow the large surface area of the second heat convection member 34 to be accommodated within the limited space of the notebook computer, securing means is provided to releasably secure the second heat convection member 34 to the heat conduction members 16 and 18, which comprises an elongated bar 38 made of a compliant, high heat conductivity material, having a first end press-fit into a slot 40 formed on the second heat convection member 34 to have the second heat convection member 34 secured to and in physical contact with the elongated bar 38.

The securing means for securing the second heat convection member 34 to the heat conduction members 16 and 18 further comprises at least one groove 42 formed on one of the heat conduction members 16 and 18 to allow a second end of the elongated bar 38 to be press-fit therein so as to joint the second heat convection member 34 to the heat conduction members 16 and 18 in a heat conductive manner. The groove 42 is shown formed on the second heat conduction member 18 in the embodiment illustrated. However, it is understood that the groove 42 may be formed on the first heat conduction member 16.

It is also possible to provide more than one such groove 42 on the first and second heat conduction members 16 and 18 which grooves 42 may extend in different directions to allow the second heat convection member 34 to be arranged at different locations inside the notebook computer. In the embodiment illustrated, a second one of such grooves, which is referenced to as 42', is shown formed on the second heat conduction member 18 in an inclined angle relative to the groove 42.

Besides the securing grooves 42 (42') formed to extend in different directions to allow easy accommodation of the second heat convection member 34 within the notebook computer, the compliance of the elongated bar 38 also provides such an easy accommodation by bending the elongated bar 38 in a desired direction. The different directions provided by the grooves 42, in combination with the compliance of the elongated bar 38, allows the second heat convection member 34 to be located inside the limited interior space of a notebook computer in a most space efficient manner.

Although a preferred embodiment have been described to illustrate the present invention, it is apparent that changes and modifications in the specifically described embodiment can be carried out without departing from the scope of the invention which is intended to be limited only by the scope of the appended claims.

What is claimed is:

1. A heat dissipating and protecting device for a computer central processing unit having a bottom surface mounted on a first surface of a printed circuit board and in contact with first ends of heat conductive plugs in holes through the printed circuit board, the device comprising:

a first conduction member for making heat conductive contact with a top surface of the central processing unit opposite to the bottom surface, a second conduction member for making heat conductive contact with second ends of the plugs at a second surface of the printed circuit board opposite to the first surface, fasteners securing the second conduction member to the first conduction member with the computer central processor unit and the printed circuit board sandwiched therebetween, a first convection member which has a plurality of fins formed thereon for heat convection, secured to and in heat conductive contact engagement with the conduction members, and a second convection member secured in a heat conductive manner with securing means to the conduction members to dissipate heat from the conduction members.

2. The heat dissipating and protecting device as claimed in claim 1, wherein a direct heat conduction path is established between the first and second conduction members.

3. The heat dissipating and protecting device as claimed in claim 2, wherein the heat conduction path between the first and second conduction members is defined by an extension from one of the heat conduction members toward the other one of the conduction members to be in heat conduction engagement with said other one of the conduction members.

4. The heat dissipating and protecting device as claimed in claim 1, wherein the fasteners that secure the second conduction member to the first conduction member comprise screws.

5. The heat dissipating and protecting device as claimed in claim 1, wherein the first convection member is secured to the conduction members by means of screws to extend laterally therefrom.

6. The heat dissipating and protecting device as claimed in claim 1, wherein the second convection member comprises a piece of large surface area, thin material of high heat conductivity.

7. The heat dissipating and protecting device as claimed in claim 1, wherein the securing means for securing the second convection member to the conduction members comprises screws.

8. The heat dissipating and protecting device as claimed in claim 1, further comprising an additional securing means for securing the second convection member to one of the conduction members, wherein the additional securing means comprises an elongated bar made of a compliant and high heat conductivity material having a first end releasably received within a slot formed on the second convection member and at least one groove formed on the one of the conduction members to releasably receive a second end of the elongated bar so as to establish a heat conduction path between the second convection member and the one of the conduction members via the elongated bar.

9. The heat dissipating and protecting device as claimed in claim 1, wherein the conduction members have a plurality of grooves formed thereon and extending in different directions to selectively engage the second end of the elongated bar.

* * * * *